United States Patent [19]

Bown et al.

[11] 4,414,621
[45] Nov. 8, 1983

[54] INTERACTIVE VISUAL COMMUNICATIONS SYSTEM

[75] Inventors: Herbert G. Bown, Kanata; C. Douglas O'Brien, Ottawa, both of Canada

[73] Assignee: Canadian Patents & Development Ltd., Ottawa, Canada

[21] Appl. No.: 314,407

[22] Filed: Oct. 23, 1981

Related U.S. Application Data

[63] Continuation of Ser. No. 806,168, Jun. 13, 1977, abandoned.

[51] Int. Cl.³ .............................................. G06F 3/14
[52] U.S. Cl. .................................................... 364/200
[58] Field of Search ................ 364/200, 900; 340/717; 358/85, 86

[56] References Cited

U.S. PATENT DOCUMENTS

| | | | |
|---|---|---|---|
| 3,382,487 | 5/1968 | Sharon | 364/900 |
| 3,438,003 | 4/1969 | Bryan | 364/900 |
| 3,453,384 | 7/1969 | Donner et al. | 364/900 |
| 3,534,338 | 10/1970 | Christenson et al. | 364/200 |
| 3,539,999 | 11/1970 | Houldin | 364/900 |
| 3,587,085 | 6/1971 | Baxter | 340/717 |
| 3,633,169 | 1/1972 | Bickford | 364/200 |
| 3,653,001 | 3/1972 | Ninke | 364/200 |
| 3,774,158 | 11/1973 | Clark | 364/200 |
| 3,872,446 | 3/1975 | Chambers | 364/200 |
| 3,912,860 | 10/1975 | Sasabe | 358/85 |
| 4,054,911 | 10/1977 | Fletcher | 358/86 X |

OTHER PUBLICATIONS

C. D. O'Brien–*Implementation of the ICPL Graphics Language on the PDP-15 Computer*–1973–3rd Man–Comp. Commun. Seminar, (part of the file).
O'Brien et al., *Image: A Language for the Interactive Manipulation of a Graphics Environment*, 1975–4th Man–Comp. Commun. Conf., (part of the file).
Foley et al.–*The Art of Natural Graphic Man–Machine Conversation, IEEE*, Proceedings, vol. 62, No. 4, pp. 462–471–1974, (Apr.), (part of file).
Newman et al.–*Principles of Interactive Computer Graphics*–1973–McGraw–Hill Book Co., pp. 171–184, (part of the file).
C. O'Brien–Image:*A Language for the Interactive Manipulation of a Graphic Environment*–1975–Thesis–(part of file).
Bown et al.–*System Independence for Interactive Computer Graphics Application Programs*–1975–Ottawa, Canada, (part of file).
*American National Standard Procedures for the Use of the Communication Control Characters of American National Standard Code for Information Interchange in Specified Data Communication Links*–1975, American Standards Institute, Inc., Ottawa, Canada, (part of file).
M. A. MacLean–*Designing a Language for Interactive Control Programs*–1971–2nd Man–Computer Commun. Seminar, Ottawa, Canada, (part of file).

*Primary Examiner*—Harvey E. Springborn
*Attorney, Agent, or Firm*—Edward Rymek

[57] ABSTRACT

An interactive visual communications system consists of a number of similar terminals linked together by narrow band communications links. Each terminal consists of visual display apparatus having a display and a display generator, an input interactive device for providing input instructions which are converted to graphic task instructions at the terminal, a processor for processing such graphic task instructions (GTI's) to control the display system and the input interactive device. The generated graphic task instructions are directed through an interaction handler which directs the GTI's to the processor as well as to a modem for transmission over the narrow band communications link to one or more similar terminals. In addition, the interaction handler receives GTI's from the other terminals which are also processed by the processor to control the display system. The display system may include a random vector display monitor or a raster graphic display monitor. An x, y raster display system which has an x, y picture memory includes comparator apparatus for identifying predetermined portions of the displayed picture by converting a line count and horizontal position on the picture to an x, y position and by comparing this x, y position to the portions of the picture being written into the x, y memory.

8 Claims, 6 Drawing Figures

INTERACTIVE VISUAL COMMUNICATIONS SYSTEM

This is a continuation of application Ser. No. 806,168, now abandoned, filed June 13, 1977.

BACKGROUND OF THE INVENTION

This invention relates to an interactive visual display communications system and more particularly to a visual communications system using narrow bandwidth communication links between the system terminals in which the common graphic picture on the terminal displays is generated or modified by any one of the terminals.

Present interactive visual display communications systems embody one of two configurations: a central computer connected to many non-intelligent terminals or a distributed system with a number of equally capable nodes connected together. The former arrangement is an extension of the conventional time-shared computing facility where cost is minimized by placing most of the computing resources at a central facility and a minimum of capability at the terminal. However, difficulty arises because of low transmission speeds and poor time-shared response. Some of the difficulty may be alleviated by providing local processing power in the terminal but this arrangement too has its own problems such as delineating the components to be placed in the terminal and that of passing information between the terminal and the central processor.

In the past, the greatest incentive for a time-shared arrangement, or a modification thereof, was the relatively high cost of processing power, memory and related computer components. With the present lower costs, and the prospects for even further decreases in the future, cost of computer components is no longer as much of a determining factor. But the cost of communication links is still unresolved, particularly if the amount of data to be transmitted is large.

On the other hand, present narrow-bandwidth visual communications systems may consist of a telewriter system, a facsimile system or a slow-scan televideo system. Of these only the telewriter systems are interactive because long delays are incurred in the use of facsimile or slow-scan television frames.

There are both mechanical and electronic telewriter systems. Mechanical telewriters use a telephone line to link two motor controlled styli and require all visual material to be traced on the sender's platen. Essentially, these machines only allow hand drawings to be simultaneously traced at a distance. Electronic telewriters forego the mechanical problems of the styli, motors and paper by outputting on a television-like display screen. Additional features such as colour, intensity and the automatic retrieval of previously generated visual images are possible, but in general these devices only reproduce simple drawings at a distance. In addition, telewriter systems do not provide a capability of interacting with the structure of the visual material. Visual data can only be handled on a line basis so that sub-sections of a picture cannot be automatically replicated or otherwise manipulated.

SUMMARY OF THE INVENTION

It is therefore an object of this invention to provide a visual communications system in which any number of physically displaced terminals may be linked to provide a common visual display at each terminal.

It is a further object of this invention to provide a visual communications system in which the terminals are linked by narrow bandwidth communication links.

it is another object of this invention to provide a visual communications system in which each of the terminals is an intelligent terminal capable of interacting with a user.

It is a further object of this invention to provide a visual communications system in which an interaction at any one terminal is immediately transmitted to all the terminals in the system to maintain a common visual display at each terminal.

It is another object of this invention to provide a visual communications system in which each intelligent terminal is independent of another in that it can operate in a stand-alone mode.

It is a further object of this invention to provide apparatus for identifying predetermined portions of a picture on a raster display.

These and other objects are achieved in a visual communications system in which each terminal consists of visual display apparatus having a display and a display generator, an input interactive device for providing input instructions at the terminal, a processor for processing graphic task instructions (GTI's) to control the display system and the input interactive device. The generated graphic task instructions are transmitted to an interaction handler which directs the GTI's to the processor as well as to a modem for transmission over a narrow band communications link to one or more similar terminals. In addition, the interaction handler receives GTI's from the other terminals which are processed to control the display system. The display system may include a random vector display monitor or a raster graphic display monitor. An x,y raster display system which has an x,y picture memory includes comparator apparatus for indentifying predetermined portions of the displayed picture by converting a line count and horizontal position on the picture to an x,y position and by comparing this x,y position to the portion of the picture being written into the x,y memory.

DESCRIPTION OF THE PREFERRED EMBODIMENT

The interactive visual communications system in accordance with the present invention sets up and maintains among a group of users what can be called a common visual space, that is, a visual picture which is identical as seen by each user. This image does not remain static; any user can add to or modify the picture and these changes are communicated to all others so that their respective pictures will be modified accordingly. The interactive capabilities of such a system can be compared to the interaction taking place when two or more people are leaning over the same note pad or using the same blackboard. The co-operation that can occur because of the solitary picture space or working area is achieved, without the necessity of physical proximity of the communicants.

Figure 1:
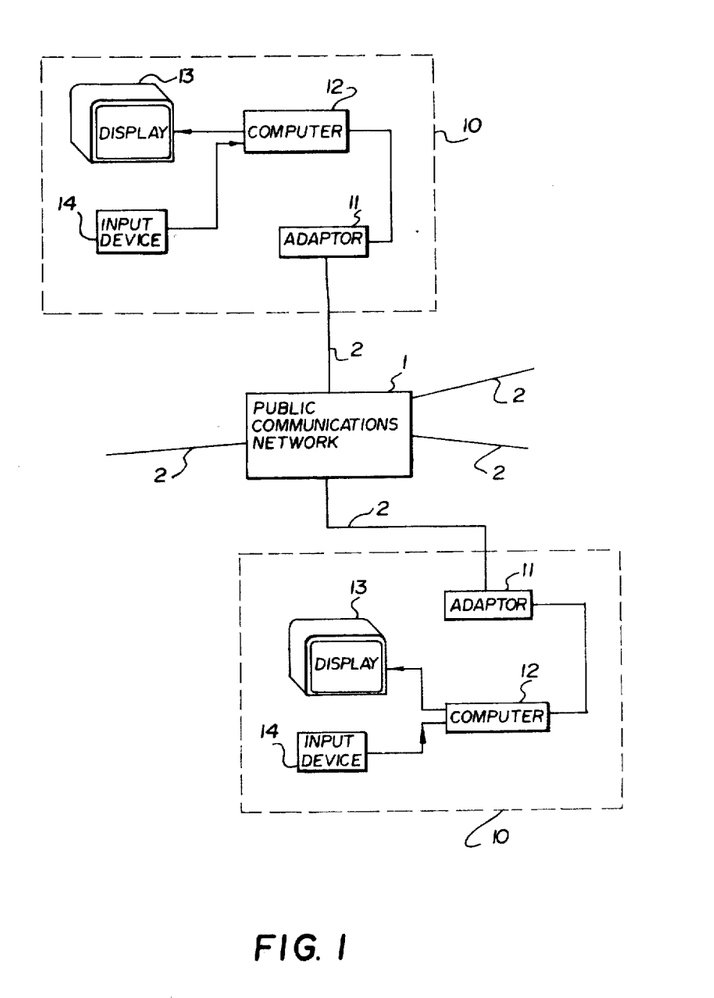
FIG. 1 schematically illustrates the interactive visual communications system in accordance with the present invention.

This system, as illustrated in FIG. 1, consists of a number of intelligent terminals 10 which are linked together by narrow-band lines 2, in a public switched communications facility 1, such as a telephone network or a telex system. Each intelligent terminal 10 includes a modem 11 or similar adaptor, a computer 12, a display 13 and an input device 14. The modem 11, which may be any type of adaptor such as the Bell 103 modem, connects the terminal 10 to the public communications network 1 via line 2. The input device 14, which may consist of one or more of the conventional input devices such as a keyboard, a light pen, a touch sensitive device, is used by the operator at the terminal to interact with it. The display 13, which may be either a random vector display or a raster graphic display, such as the RGP 3000/4000/5000 manufactured by Norpak Ltd., Pakenham, Canada, displays the graphic picture to the operator. Finally, the computer 12 performs the function of an information compressor between the high bandwidth operator-computer interface and the display-computer interface, and the low-bandwidth computer-adaptor interface. The computer 12 may be of any conventional type such as the Digital Equipment Corporation PDP9/15 or PDP11. The computer 12 at each terminal 10 is used to maintain the visual picture on the display 13 of that terminal and to perform modifications to the picture which are requested by the operator through input device 14 at the same terminal 10 or at one of the other terminals 10 in the system. Since each computer 12 maintains the picture on its display 13, only the interactions of the operators need to be transmitted through the public communications network 1 to each terminal 10 such that the same modification is performed simultaneously to the picture on each display 13. For example, if the visual picture over which two cartographers are communicating is a map, and one operator interacts with his terminal 10 to change the projection of the map, then only the small amount of data required to encode the interaction is transmitted, and each computer 12 in the system simultaneously modifies the projection of the map on its corresponding display 13. This results in an information concentration over a process in which the entire new picture is transmitted or even a process wherein only the changes between the new image and the previous one are transmitted. Thus, the communication system in accordance with this invention maintains a common visual space, that is, the visual picture viewed by each operator is identical, and any one of the operators can add to or other-wise modify the picture.

Since the computer 12 is programmable, specialized features can be added for particular applications, and the same terminal 10 can support, for example, a map communication system for cartographers, an electrical circuit communication system for engineers or a symbol communication system for the handicapped. Also because of the computer 12 at each terminal, special interaction tools, such as data processing, can be added to each specialized communication system so that, for example, the cartographer can request that computer 12 calculate the area of an outlined section of a map.

As discussed above, the system may include any number of terminals 10 since there is no master-slave relationship between the terminals 10 and thus each terminal has the capability of stand-alone operation. In addition, although it has not been shown in FIG. 1, the system can include an audio link between terminals 10 to enable voice communications.

Figure 2:
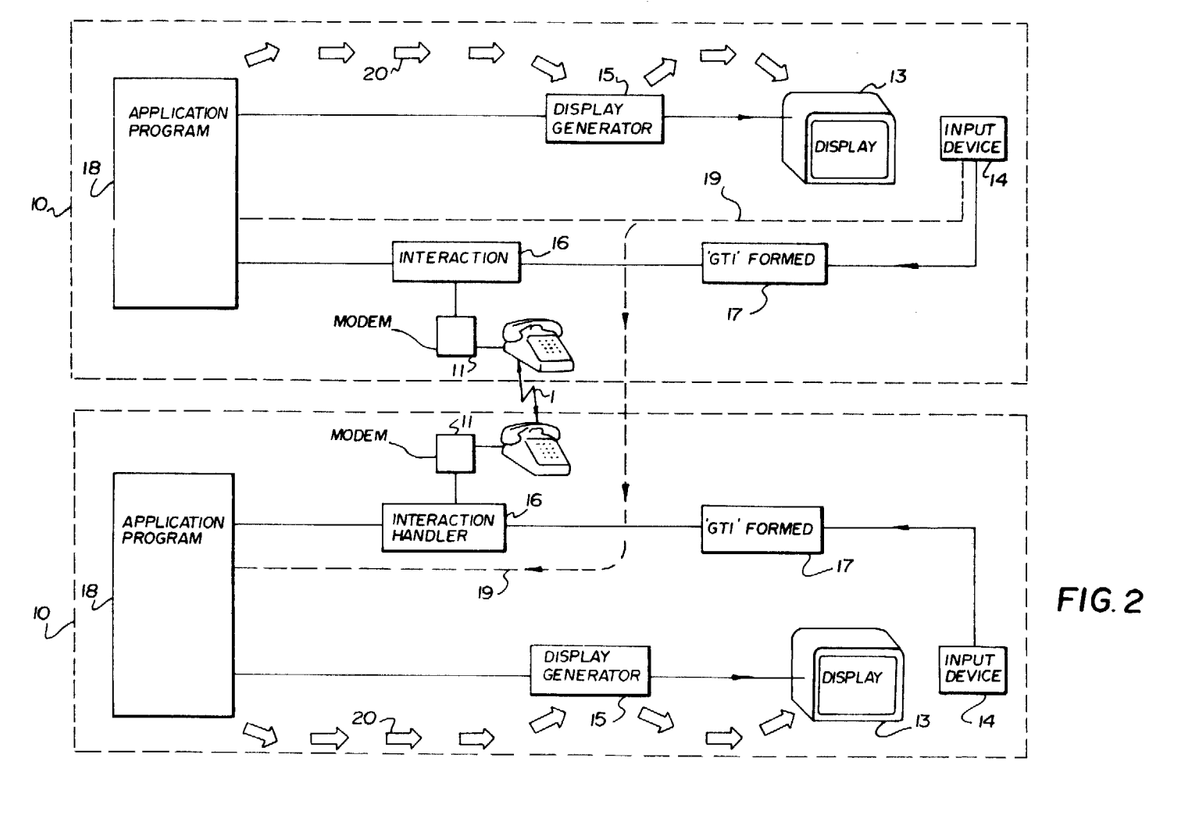
FIG. 2 illustrates the functional structure of the interactive visual communications system.
Figure 5:
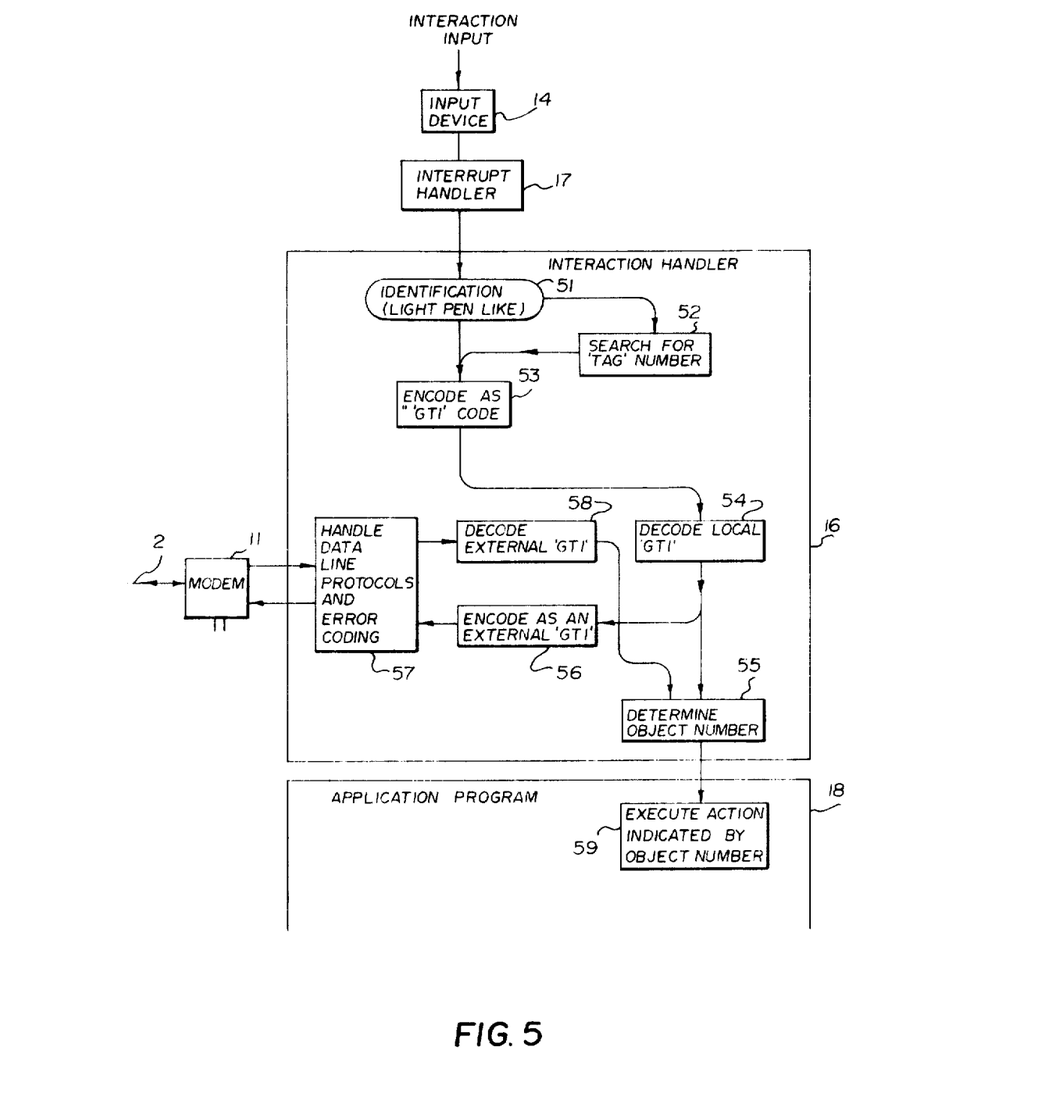
FIG. 5 illustrates the function of the interactive handler.

The functional structure of the interactive visual communication system in accordance With this invention is schematically illustrated in FIG. 2, a two-terminal system being illustrated. When an interaction is performed by the operator using the input device 14, a graphical task instruction or GTI is formed by the interrupt handler represented by block 17. This GTI may, for example, represent a request for an addition or deletion to the picture on display 13 or a data processing request. Graphic task instructions are discussed in C. O'Brien, "IMAGE: A Language for the Interactive Manipulation of a Graphics Environment", at page 142, a masters thesis submitted to the Faculty of Graduates Studies in Engineering, Carlton University, Ottawa, Canada, May 1, 1975; H. Bown, C. O'Brien, R. Warburton and C. Thorgeirson, "System Independence for Interactive Computer Graphics Application Programs," Proceedings of the 4th Man-Computer Communications Conference, May 26-27, 1975, Ottawa, Canada, at pages 1-11 and 1-12. The GTI is directed to an interaction handler 16 which receives the GTI and performs the functions of transforming the GTI into a packet of interaction information and of channeling the GTI to its corresponding application program processor 18 as well as to the processor 18 in each of the other terminals 10 via the public communications network 1. The interaction handler 16, which may be a software module in the computer 12 (FIG. 1), is shown in the functional block diagram in FIG. 5. With reference to FIG. 5, the interaction handler is made up of conventional elements using standard coding techniques for data communication links such as the American National Standard procedures for the use of communications control characters of American National Standard Code for information interchange in specified data communications links, ANSI X3.28, 1976, National Library Classification Serial T4.A5S7. Thus, the interaction handler 16 transforms the GTI into a packet of interaction information; that is, a command for the terminal computer to perform a given action.

The application program processors 18 in each terminal receive the packet of interaction information, and simultaneously process it to generate picture change information in the form of internal GTI commands for their respective display generators 15 which control the displays 13. These internal GTI commands to the display device 13 are not communicated over the inter-terminal communications network 1, but are simultaneously generated by each terminal application program processor 18 for its own display 13. The amount of information which is transferred over the communications network 1 is therefore only a single packet of interaction information while the information which is transmitted to the display may be a large number of updates to the displayed picture.

The packets of information indicating what user interactions occurred may be saved in a transaction table within processor 18. Data from this table can be used to bring a third party up to date if he enters a multi-terminal conversation after it has begun, and because of its compact nature can be used to store pictures by the method they were created rather than by a line description. If a terminal in a stand-alone manner has created a data-base of pictures they can be transmitted to other terminals in this format.

All terminals can access a common data base stored on some dial accessable computer so that individual terminals could modify some common data base which could then at a future date be accessed by additional members of the working team. Since the terminals function by simultaneously reacting to identical interaction inputs, it is essential that the data bases upon which they operate be identical, or that they have equal access to externally stored information.

As indicated by the size of the arrows 19 and 20, and as seen from the above, the packet of information resulting from user interaction, dashed line arrow 19, is small. This information is passed on to the application program processor 18 in the same terminal 10 as well as simultaneously communicated over the public network 1 to the application program processor 18 of the other terminal. All terminals in the system receive this interaction information. The packet of interaction information received by the application program processor 18 of each terminal 10 is processed and the necessary changes, if any, are generated in GTI format to modify the image on the display 13. The relative amount of information generated by the application program processor 18 and passed on to the display 13 is indicated by the large broad arrows 20. Thus, the amount of information transferred over the communications network 1 between terminals 10 is only a single packet of interaction information, whereas, the information that is passed on to the display 13 may be a large number of updates to modify the displayed picture.

Figure 3:
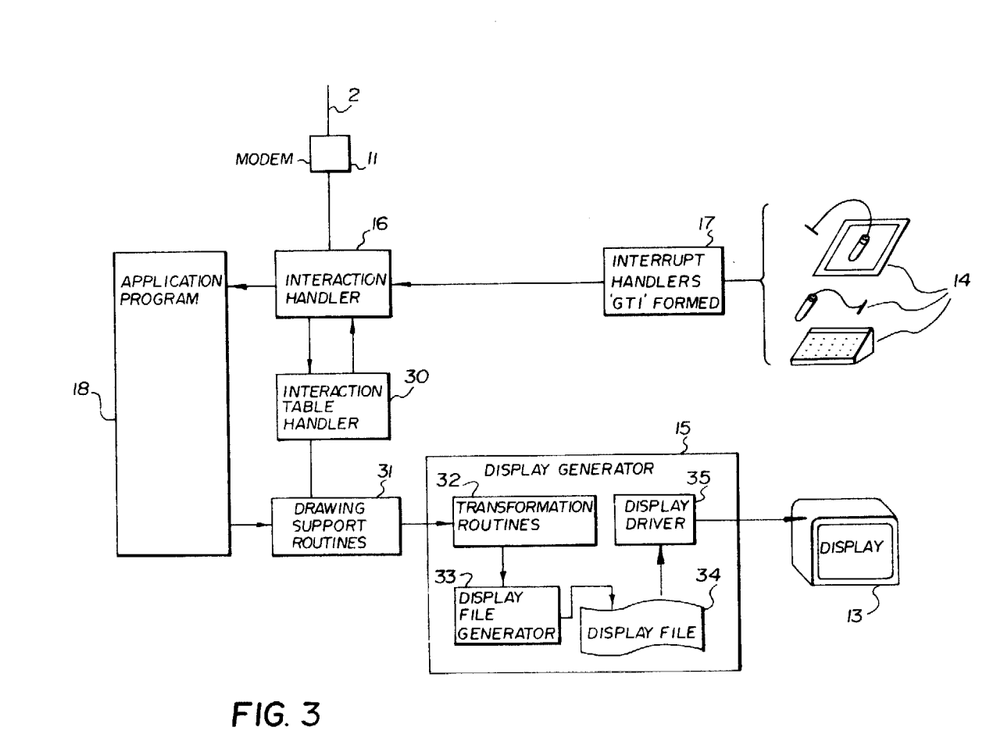
FIG. 3 illustrates a single processor terminal configuration.
Figure 4:
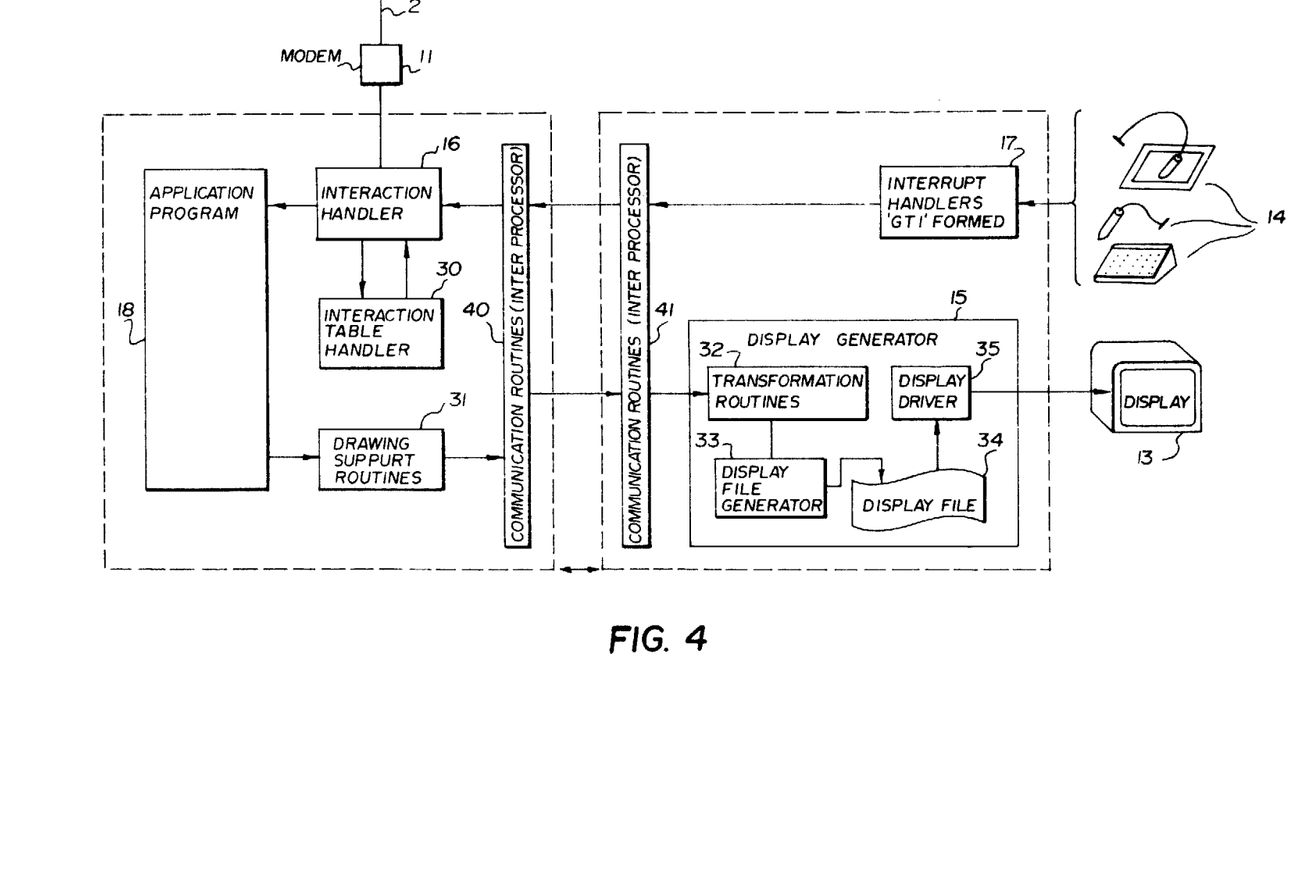
FIG. 4 illustrates an alternate dual processor terminal configuration.

A terminal of the visual communications system consists of display components, input components, communications components and a computer component. Two preferred embodiments of this terminal consist of a device using two computer processors to function as the computing component, and one where a single computer processor is used to function as the computing component. The embodiment using one computer processor is less expensive, while the embodiment using two computer processors has a better response and display generation speed because the computational load is split between the two processors. FIGS. 3 and 4 illustrate the single and dual processor terminal configurations respectively.

The operation of a terminal of the visual communication system is described below. Input to the terminal 10 is entered into the terminal via an input device 14. The interrupt handler 17 is activated and all other operations of the processor 18 are suspended while the processor 18 handles this task. The input is classified as to the type of interaction, and a GTI is formed encoding this information. If the input involves selection between portions of the displayed picture a 'tag mechanism' is used to identify which object was selected. The encoded input is then communicated to the interaction handler 16, either directly or over the inter-processor communications link. When communicated over the inter-processor communications link, the input is transmitted via the modem 11 and inter terminal communication line 2 to other terminals and, is saved in a table of interaction inputs, and is communicated to the application program 18.

The interaction table handler 30 (see FIG. 4) records all of the interactions that pass through the interaction handler 16 from the interrupt handlers 17. This record may be used to analyse, at a later date, a communication session that occurred. Also, the interaction table handler 30 may feed the interaction GTI's to the interaction handler 16 to bring two or more communication terminals into synchronization or for error recovery.

The application program executed by processor 18 is specially written to suit particular applications. A special high level programming language has been written to make the preparation of application programs a simple task. This language has a interaction control structure which allows the actions which occur upon interaction inputs, to be easily defined. Examples of high level programming language suitable for the application program executed by processor 18 in the present invention are discussed in the above-referenced O'Brien thesis, ch. 4, pp. 29-88, as well as in M. Maclean, "Designing a Language for Interactive Control Programs," 2nd Man-Computer Communications Seminar, May 31-June 1, 1971, Ottawa, Canada; C. O'Brien, "Implementation of the ICPL Graphics Language on the PDP-15 Computer," 3rd Man-Computer Communications Seminar, May 30-31, 1973, Ottawa, Canada; C. O'Brien & H. Bown, "IMAGE, A Language for the Interactive Manipulation of a Graphics Environment," 4th Man-Computer Communications Conference, May 26-27, 1975, Ottawa, Canada.

Dependent upon the application program executed by processor 18, the action resultant from the interaction input may be to modify the picture on the display screen 13. The application program executed by processor 18 will invoke the drawing support routines 31. The drawing support routines 31 are a subroutine package which convert the drawing commands issued by the application program executed by processor 18 into internal GTI drawing codes for transmission to the display generator 15. These codes control the display generator 15. Commercially available display generators suitable for use in the subject invention include an Incremental Graphic Processor, an RGP 400/500 Raster Graphic Processor, and an RGP 3/4/5000 Series Raster Graphic Processor, manufactured by Norpak Ltd., Pakenham, Canada, and the GT40 Graphic Display System manufactured by Digital Equipment Corporation. The display generator transforms each internal GTI drawing code into a low level descriptive of the picture on the display screen 13. When the internal GTI drawing codes are transmitted to the display generator 15 the numeric co-ordinates for position of a drawing on the screen are transformed by the transformation routines 32. This transforms the user's conceptual drawing space into the real hardware co-ordinate system of the display hardware 13. The functions of scaling, rotating, translating, reflecting and clipping are performed by the transformation routines 32. This is done using matrix multiplication techniques in software or hardware. The display file generator 33 generates and maintains a list of display instructions referred to on the display file 34. The display file generator 33 performs the function of insertion, deletion and compaction of the display file 34. A display driver 35 examines the display file and maintains a picture on the display 13. The display driver 35 interprets the instructions from the display file 34 and generates the required voltage signals to form a picture on the display 13. The display driver 35 may be constructed entirely of hardware or may be a combination of hardware and software. When using a display 13 of the random point to point refresh type (e.g. the NORPAK IGP), the display driver 35 must continuously refresh the display 13 interpreting instructions from the display file 34 and is usually constructed entirely of hardware. When using a display 13 of the raster type (e.g. NORPAK RGP) the display driver 35 has to only generate the picture for the display 13 once and update the picture when the display file generator 33 modifies the display file 34. In the dual processor terminal configuration shown in FIG. 4, the operation of the system is essentially the same. The only differences are that communication routines 40 and 41 are used to communicate GTI's from the interrupt handlers 17 to the interaction handler 16 and to communicate internal GTI codes drawing from the drawing support routines 31 to the display generator 15. A dual processor system is preferred because the computation load of the display generator 15 and the interrupt handlers 17 are separated from the host computer.

FIG. 5 illustrates the information flow for an interaction input.

As has been described above, an interaction input is entered via input device 14. The input device 14 activates the interrupt handler 17 which forms a GTI that is communicated to the interaction handler 16. The interaction handler 16 first operates by classifying the type of interaction. The various types of interaction possible are well known in the art. Examples of interaction types, including pushbutton, marker, sketch and identifier are discussed in the above-referenced O'Brien thesis and in J. Foley & V. Wallace "The Art of Natural Graphic Man-Machine Communication," Proceedings of the IEEE, vol. 62, no. 4, pp. 462-71 (April 1974). If the interaction is an identification interaction 51, then a search 52 is made of the list of displayed material to find the 'TAG' number, of numeric encoding of which part of the displayed picture was identified. The 'TAG' number, or in the case of other types of interaction the associated data, is encoded 53 in the form of a GTI code.

The interaction input is communicated as a GTI formed by interrupt handler 17 to the communication portion of the interaction handler 16. It is decoded 54 and a table lookup is done to determine the object number 55. The object number 55 is a numeric encoding of which action 59 will result from the interaction.

The interaction input is also encoded as an external GTI 56. This encoding is done to facilitate the transmission of the interaction information over a communications line 2 through modem 11. Error coding and format protocols 57 are added to facilitate error checking to ensure error free transmission of the information.

On the receiving end of the inter-terminal communications line 2 the interaction input is error checked 57 and decoded 58, and then submitted to the application program executed by processor 18 in the same manner as a local interaction input.

The communications component of a terminal of the visual communications system is not specific. Any communications system capable of reliably transmitting data may be used. Reliable results have been obtained using communications bandwidths down to 200 baud. A communications system such as the public telephone network with data access via Bell 103 modems 11 at 300 baud over dialup lines, may be used, as well as packet switching data network such as Datapac or Infoswitch.

The input device 14 of a terminal of the visual communications system is not specific. Any graphical input device may be used. Some examples of such devices are a light-pen, tablet, track-ball, joystick or keyboard. Such devices are described, for example, in W. Newman and R. Sproull, *Principles of Interactive Computer Graphics*, pp. 171-84 (McGraw-Hill Book Co., 1973) (hereinafter "Newman & Sproull"). The interaction handler 16 is designed to classify the type of interaction and process it, so that any input device may be used.

The display component of the visual communications terminal may be either a raster graphics display unit or a random vector refresh unit. The Newman and Sproull reference discusses both types of displays. (Newman and Sproull, pp. 59-80) Raster graphic display suitable for this application are listed above. Although the technologies of both of these units are quite different, the display generator 15 may be modularized so that either display unit can be used. The raster graphics technology is preferred because of the larger class of images which can be displayed.

There is some interaction between the interrupt handler 17 and the display generator 15. Upon an interaction input through an input device 14, it is necessary for the interrupt handler 17 to determine which part or portion of the displayed picture was identified. In the case of the light-pen a signal is generated by the device 14 in terms of the x,y position that the pen struck the displayed picture. This positional information is converted into an 'OBJECT' number for use by the application program. This is done by searching a table of delimiting tags 55 (See FIG. 5). In the case of a random vector refresh unit the display driver is continuously refreshing the display 13 from the display file 34 (see FIG. 4). Upon an interaction input the portion of the display file 34 being refreshed indicates the delimiting tag and therefore the OBJECT number. Since the display on a raster graphics display unit is not continuously being refreshed, a different more complex approach in necessary.

Figure 6:
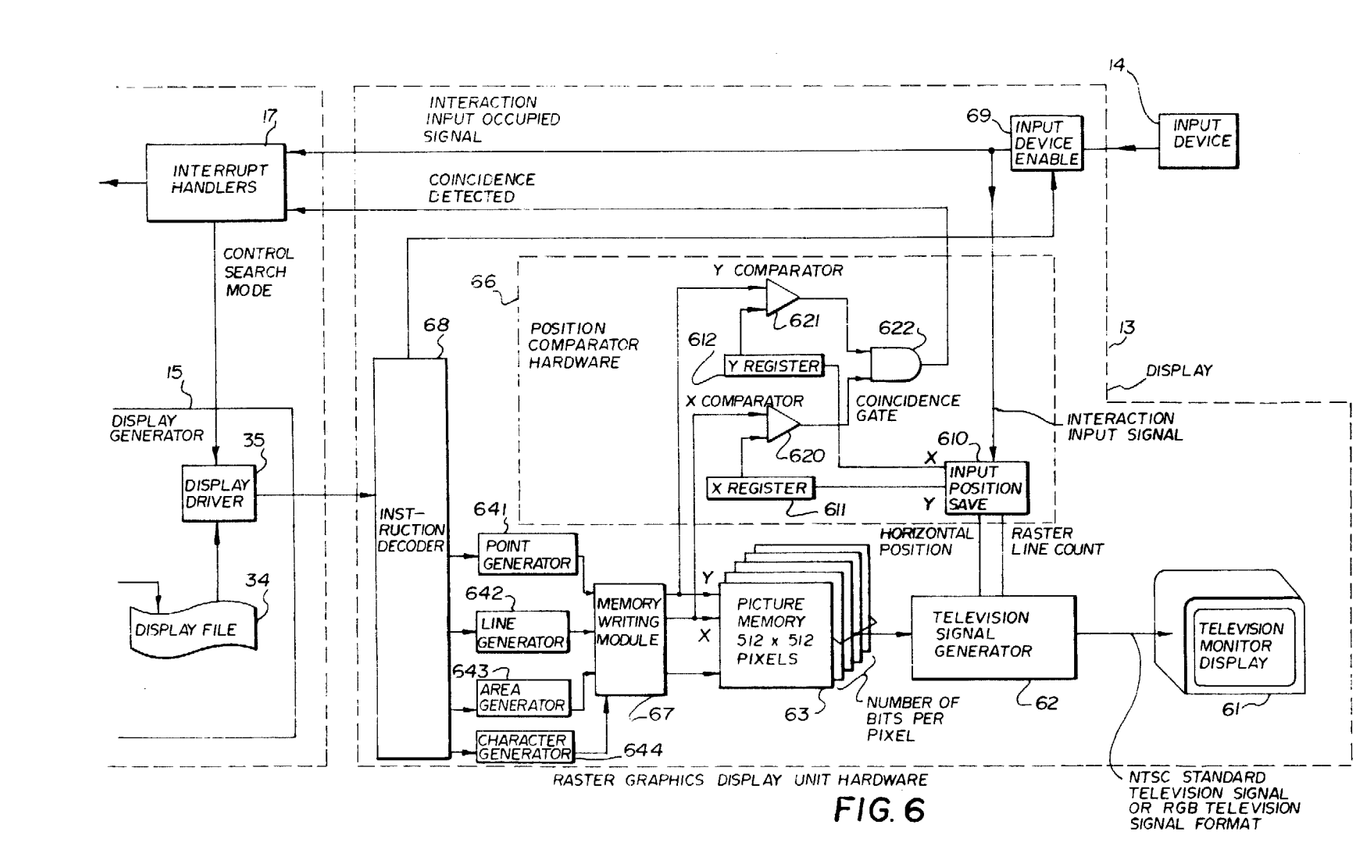
FIG. 6 illustrates one embodiment of a raster graphics display unit.

A raster graphics display unit 13 is illustrated in FIG. 6. A standard television or high performance monitor is used as the display 61. The signals required to drive the television are derived from the television signal generator 62 which continuously reads a picture memory 63. This memory is arranged as 512 by 512 bytes where the number of bits in a byte determine the number of colours or grey levels which may be displayed. Each of the positions is called a pixel. Since the picture is stored in the pixel memory in positional form, the display driver 35 is not continuously accessing the display file 34, but builds the picture in the pixel memory 63 once. Hardware point generators 641, line generators 642, area generators 643 and character generators 644 are provided in the hardware of the raster graphics display unit to aid the display driver 35 build the picture in the pixel memory 63. Drawing instructions from the display file 34 are interpreted by the display driver 35 and transmitted to the display device 13 where the instruction decoder 68 determines the class of drawing command. Either a point generator 641, a line generator 642, an area generator 643 or a character generator 644 is invoked. The memory writing module 67 takes the output from these generators and writes a picture in the picture memory 63.

Novel apparatus is described for the raster graphics display unit for assigning tag numbers to interaction inputs. When a tablet or similar positional device 14 is used for input, an x,y position is obtained. When a lightpen is used on a raster display, a line count and horizontal position are obtained in terms of timing information. This is converted to an x,y position. To convert the x,y position to a tag number, the raster graphics display unit is placed in search mode and a position comparator 66 is used. The x,y position from the input device 14 is communicated to the interrupt handler 17 and the x,y position is saved 610 within the position comparator 66. The data is also loaded into the x comparator register 611 and the y comparator register 612. The interrupt handler 17 requests the display generator 15 to instruct the display 13 to enter search mode. The instruction decoder 68 disables further inputs by the device enable gate 69. The display driver 35 then proceeds from the top of the display file and retransmits every point, line, area and character. When a coincidence, within a given accuracy, is detected by the comparators 620,621, 622 the information which is being accessed in the display file 34 at the time is recorded by the display driver 35. The tag number is calculated from the last coincidence in re-transmitting the entire display file if there are intersecting pictures in the picture memory 63.

We claim:

1. An interactive visual communications system for maintaining identical visual pictures at a number of terminals linked by narrow bandwidth transmission lines, each of said terminals comprising:

visual display means;

input means for providing input instructions at said terminal;

means coupled to the input means for converting said instructions to graphic task instructions;

interaction handler means coupled to the converting means for receiving and for transmitting the graphic task instructions over the narrow bandwidth transmission lines to one or more further terminals, and for receiving graphic task instructions generated at the one or more further terminals over the narrow bandwidth transmission lines; and processor means coupled to the interaction handler means for receiving the converting means graphic task instructions and the graphic task instructions received from the one or more further terminals for processing the graphic task instructions, said processor means being coupled to the display means for controlling the display means to modify and maintain the picture on the display means in accordance with said graphic task instructions.

2. Apparatus as claimed in claim 1 wherein the interaction handler means includes first means for directing the converting means terminal graphic task instructions to the terminal processor means, and second means for directing the converting means terminal graphic task instructions for transmission over the narrow bandwidth transmission lines to the one or more further terminals.

3. Apparatus as claimed in claim 2 wherein said second means includes means for receiving the graphic task instructions from the one or more further terminals transmitted over the narrow bandwidth lines and for directing the received graphic task instructions to the processor means.

4. Apparatus as claimed in claim 3 which further includes interaction table handler means coupled to the interaction handler means for sequentially recording the graphic task instructions directed to the processor means in a memory means, the memory means being accessible by the interaction handler means.

5. Apparatus as claimed in claim 3 which further includes display generator means coupled to the processor means for transforming processor display commands to low level descriptives of the image for the display means, said display generator including transformation routines, a display file generator for generating and maintaining a display file, and a display driver for maintaining the image on the display means.

6. Apparatus as claimed in claim 5 wherein the display means includes a random vector display monitor.

7. Apparatus as claimed in claim 5 wherein the display means is a raster graphic display monitor.

8. Apparatus as claimed in claim 7 wherein the display means further includes instruction decoder means coupled to the display driver for providing drawing commands to a point generator, a line generator and an area generator; x,y picture memory means; memory writing module coupled to the point generator, the line generator and the area generator for writing a picture into the picture memory; and television signal generator coupled to the picture memory for continuously driving the raster display monitor.

* * * * *